March 14, 1950     A. E. WEST     2,500,725
SAFETY VOLTAGE DETECTOR

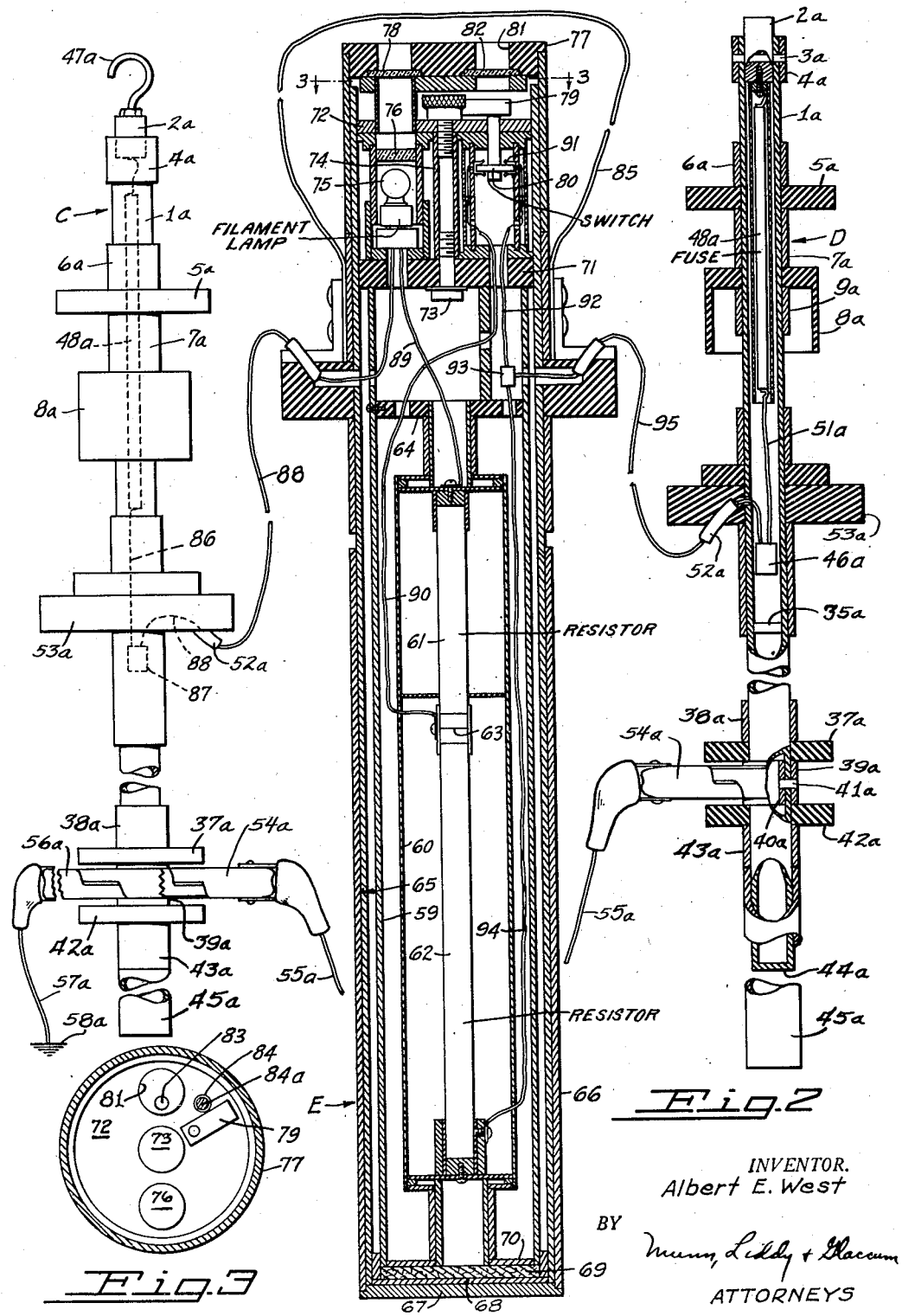

Filed May 8, 1945     3 Sheets-Sheet 3

INVENTOR.
Albert E. West
BY
Munn, Liddy & Glaccum
ATTORNEYS

Patented Mar. 14, 1950

2,500,725

UNITED STATES PATENT OFFICE 2,500,725

SAFETY VOLTAGE DETECTOR

Albert E. West, Piedmont, Calif.

Application May 8, 1945, Serial No. 592,629

2 Claims. (Cl. 175—183)

An object of my invention is to provide a safety voltage detector in which the line wire or other live contacts can be checked to see whether a current at a high voltage is passing therethrough before the lineman starts his work. The device is portable and comprises one, two or three units, depending upon the nature of the checking to be accomplished.

A further object of my invention is to provide a device of the type described which has novel indicating means for determining whether a current is flowing through the conductor to be checked. The indicating means can be a neon or other gas lamp, a filament lamp or a meter. The device is designed to check current at voltage from 1000 up to 15,000 volts.

A still further object of my invention is to provide a device of the type described in which the current flowing through the device is insulated from the outer surfaces of the device so that it cannot reach the operator. Any creepage current flowing along the outer or inner surfaces of the device passes to a grounded member before it can reach the operator. This arrangement permits the device to be used in rainy weather with safety. I also provide barriers to prevent any creepage current from flowing down the inside of the device below a predetermined point.

The device is simple in construction and is readily portable by a linesman from place to place.

Other objects and advantages will appear in the following specification, and the novel features of the device will be particularly pointed out in the appended claims.

My invention is illustrated in the accompanying drawings forming a part of this application, in which:

Figure 2 shows a modified form of the invention with parts being shown in section and other parts in elevation;

Figure 3 is a horizontal section taken along the line 3—3 of Figure 2; and

While I have shown only the preferred forms of my invention, it should be understood that various changes or modifications may be made within the scope of the appended claims without departing from the spirit and scope of the invention.

Figure 1:
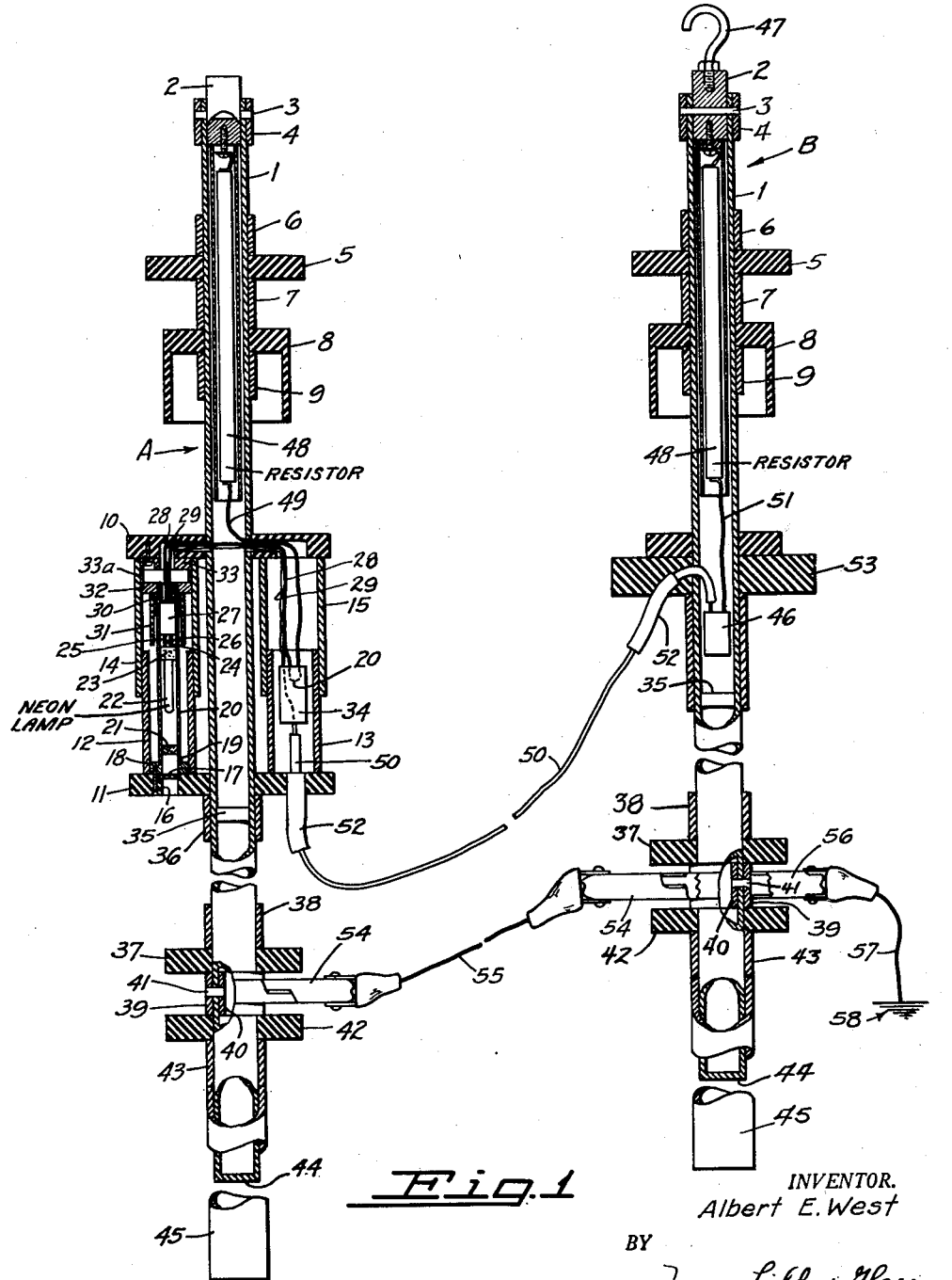
Figure 1 is a vertical sectional view through my device, portions being shown in elevation.

In carrying out my invention, I will first describe the form shown in Figure 1. This form comprises a main staff indicated generally at A and an auxiliary staff indicated generally at B. The staff A comprises a tubular member 1 made out of an insulating material and carrying an electric terminal 2 that is preferably made of brass or copper and is cadmium plated. A pin 3 connects the terminal to the tube and a reinforcing sleeve 4 is also secured in place by the pin and encircles the upper end of the tube 1.

An insulating shoulder 5 is mounted on the tube 1 and is held in place by collars or sleeves 6 and 7. A petticoat insulator 8 is also mounted on the tube 1 and abuts the collar or sleeve 7. Another collar 9 bears against the underside of the petticoat insulator and holds it in place.

Still further down on the main staff tube 1, I mount an upper base member 10 and a lower base member 11. The lower base member has two cylindrical casings 12 and 13 that telescope within two cylindrical casings 14 and 15 carried by the upper base 10. The lower base 11 has an opening 16 that registers with the casing 12 and a Lucite disc 17 closes the top of the opening 16 and is held in place by a fibre disc 18. The disc 18 has an opening 19 therein for receiving a lamp receiving casing 20. Near the lower end of the lamp casing I mount a second Lucite disc 21 and above the disc I mount a neon or other gas lamp 22 or filament lamp. The lamp is supported by a lamp base 23 that has prongs extending from the lamp base into a socket 24. The socket has terminals 25 and 26.

The terminals are removably received in a socket 27 and wires 28 and 29 lead from the socket for a purpose presently to be described. The socket 27 is secured to a disc 30 and an insulating sleeve 31 covers a portion of the lamp tube 20. The disc 30 is secured to a larger disc 32 which in turn is spaced from a disc 33 by a ring 33a. This construction provides a watertight seal for the lamp and the insulation prevents any current passing to the lamp from escaping.

The casing 13 encloses a connection housing 34. In this connection housing are placed the wires 28 and 29 and they are connected to other wires in a manner hereinafter described. An insulator 35 is placed within the tube and stops any creepage of electricity along the interior surface of the tube. A sleeve 36 is mounted on the outside of the tube 1 and holds the lower base 11 in position on the staff A.

I provide novel means for grounding any electricity that might creep along the exterior surface of the device or along the interior surface and get past the barrier 35. A shoulder 37 is mounted on the tube 1 and is held in place by a sleeve 38. A metallic ring or ground collar 39 is placed under the shoulder 37 and is connected to an interior metal ring 40 by a rivet 41. A second shoulder 42 is placed under the outer ground collar 39 and is held in place by a sleeve 43. The tube 1 terminates at an end 44 and a removable extension handle 45 may be telescoped over the tube to increase its length as desired.

The auxiliary staff B is identical in construction with the main staff A and where the parts are identical, like reference numerals will be used and further description need not be given. I do not show the lamp 22 and the connection housing 34 in the auxiliary staff B. I do show a connection housing 46 placed within the tube 1 and above the electric barrier 35 for the auxiliary staff B. The terminal 2 of the auxiliary staff has a hook 47 removably secured thereto. The main staff A has a resistor 48 in electrical connection with the terminal 2 and the same is true for the auxiliary staff B. Each resistor is composed of two units of 10 megohms each. A wire 49 leads from the resistor 48 of the main staff to the connection housing 34 and this wire is connected to the wire 28 that leads to the lamp 22. The wire 29 leading from the lamp is connected to a wire 50 in the connection housing 34 and the wire 50 is connected to a wire 51 in the auxiliary staff B in the connection housing 46. Reinforcing rubber sleeves 52 are mounted on the wire 50 where these wire portions enter the base 11 and the base 53 of the auxiliary staff. The wire 51 is connected to the resistor 48 in the auxiliary staff and this completes the circuit from the terminal 2 of the main staff to the hook 47 of the auxiliary staff.

It is possible to electrically connect the two staffs A and B by clips 54 that are snapped onto the rings 39 of the staffs and these clips are electrically interconnected by a wire 55. Either staff may be grounded and I have shown the auxiliary staff B with a clip 56 snapped onto the collar 39, the clip being connected to a wire 57 that extends to ground 58.

In using this form of the device, the hook 47 is connected to the wire to be checked and then the terminal 2 of the main staff A is pressed against a terminal or other contacting member that will complete the circuit through the device should the wire to which the hook is connected be a live one. The indicator lamp 22 will glow and indicate the current. A voltmeter or a filament lamp could be used as the indicator. The resistors 48 may be of any size desired. The resistors reduce the current flow through the device to a fraction of a milliampere, which means that the current flowing through the wire 50 and lamp 22 is so small as not to cause any damage to the operator.

The device shown in Figure 1 is designed to check line voltages up to 15,000 volts. Where the line voltages up to 5000 are to be checked, the resistors 48 may be one-third as high as the ones mentioned. The shoulder 5 and the petticoat insulator 8 may be dispensed with when the device is used only for checking a 5000 volt current. When the larger current is being tested, the petticoat insulator 8 will keep the portion of the tube 1 and the collar 9 disposed within the insulator, dry and therefore any surface creepage of electricity due to dampness, will be prevented from moving on past the insulator 8. The device can therefore be used in stormy and rainy weather.

The operator after making electrical connection with the wire to be tested, glances into the opening 16 and if there is a current flowing in the wire, the glow from the lamp 22 can be seen. The operator uses the device above his head and it is an easy matter for him to glance upwardly into the opening 16 to see whether the lamp is illuminated. The extension handles 45 give greater length to the device when the operator wants a greater distance or more safety. The wire 55 and the ground wire 57 are used only in wet weather.

In Figure 2 I show two staffs C and D, each of which are similar to the staff B. Like parts will therefore be given the same reference numerals except that the letter $a$ will be added after each numeral so used. It is best to describe the tester indicated generally at E before describing the operation of the device shown in Figure 2 which comprises the tester and the two staffs C and D. The tester has an inside casing 59 in which a resistor casing 60 is mounted. Resistors 61 and 62 are placed within the casing and electrically connected together at 63. The top of the resistor casing 60 is spaced from an insulating partition 64 and the bottom of the resistor casing is spaced from the lower end of the casing 59 so that proper insulation will be provided. An air space separates the resistors 61 and 62 from the casing 60 and a second air space separates the resistor casing from the casing 59. A third air space separates the casing 59 from a casing 65 and the latter casing is enclosed in a fibre outer cylinder 66 for protection. The lower end of the casing 66 carries a fibre disc 67 on which a second disc 68 rests and this disc has a felt washer 69 placed thereon and the felt washer is covered by a disc 70.

At the upper end of the tester E I place a partition 71 that has openings for wires to pass therethrough. A second partition 72 is connected to the first by a sectional bolt 73 that has an insulating tube 74 interconnecting the two sections. A filament lamp 75 is mounted above the partition 71 and a Lucite disc 76 is placed above the lamp. A cover 77 carries a Lucite disc 78 that is in line with the disc 76 so that light rays from the lamp can be seen.

A switch arm 79 rocks a single pole double break switch 80 for purposes hereinafter described. The cover 77 has an opening 81 that has a Lucite disc 82 therein. It will be noted that the partition 72 has a white spot 83 that may be seen through the opening 81 when the switch arm 79 is in closed position. A swinging of the switch arm into open position will swing it so as to cover the white spot 83. The switch arm has a red portion which may be viewed through the opening 81 and the operator will know that when this red portion is visible, both of the resistors 61 and 62 are connected in series. The partition 72 has a recess 84 for receiving a pin 84a, carried by the cover, see Figure 3. The cover when in closed position causes this pin to be received in the opening 84 and this pin will prevent accidental swinging of the switch arm 79 from closed to open position or vice versa. A strap 85 supports the tester E.

When using this form of device, the hook 47a of the staff C is placed over a wire or contact and the current will pass through a fuse 48a and then by means of a wire 86 to a connection housing 87. A wire 88 leads from the connection housing to the lamp 75 in the tester E. A wire 89 connects the lamp 75 with the top resistor 61. A wire 90 leads from the other end of the resistor 61 to one pole 91 of the switch 80. Another wire 92 leads from the other pole of the switch to a connection housing 93. One end of the lower resistor 62 has a wire 94 leading to the connection housing 93. A wire 95 that connects with the wires 92 and 93 leads to a connection housing 46a in the staff D. A wire 51a is connected to the wire 95 and to a fuse 48a which in turn is connected to the terminal 2a of the staff D.

When the hook 47a is connected to the live wire or contact and the terminal 2a of the staff D connected to another portion which will close a circuit in case a current is flowing through the live wire, the lamp 75 will glow and indicate that such current is flowing in the live wire being tested. When 15,000 volts are being tested both resistors 61 and 62 are connected in series by the opening of the switch 80 and this will show the red portion of the switch arm 79 in the opening 81.

When only 5000 volts are to be tested, the switch arm 79 is swung into closed position, which will short out the resistor 62. The staffs C and D may be connected by the wire 55a in the manner as the staffs A and B. When the tester E is set for 5000 volts, if the voltage of the current is two or three thousand volts, the indicator lamp 75 will glow dimly. When four to five thousand volts pass through the indicator lamp, it will light up bright. In this way the amount of light given off by the lamp will indicate the strength of the voltage of the current flowing through the wire.

The same thing will apply when the switch 79 is set for 15,000 volts. When the voltage is between 6000 to 9000, the indicator lamp will glow dimly and when the voltage is between 10,000 to 15,000 volts, the lamp will burn brightly. This applies only when a filament type lamp is used.

Figure 4:
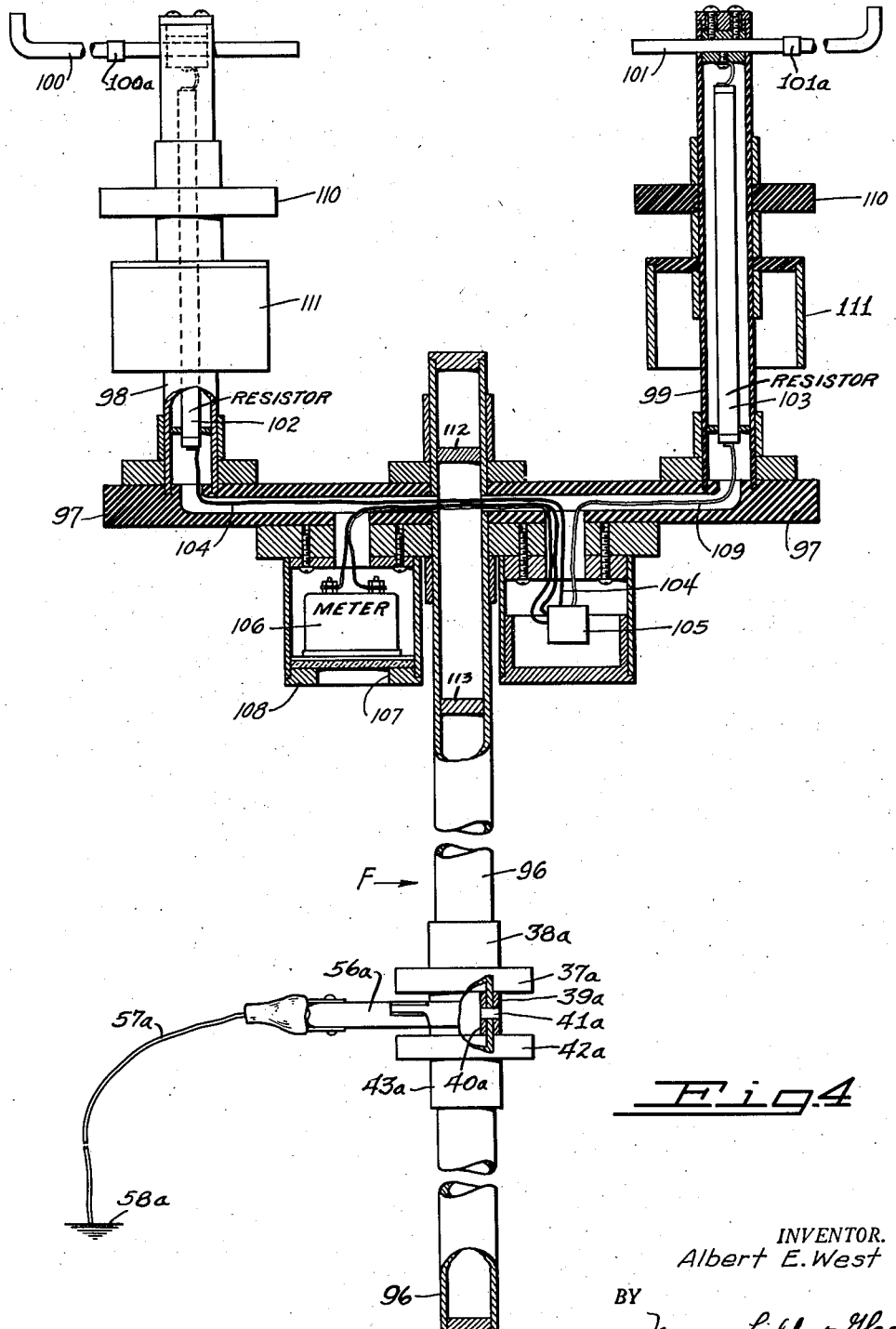
Figure 4 is a vertical section through still another modified form of the device, the portions being shown in elevation.

In Figure 4 I show a one-piece tester indicated generally at F. This tester has a central tubular member 96 which carries an arm 97 at the ends of which are mounted two posts 98 and 99. Each post has an adjustable contact 100 and 101 at its top and resistors 102 and 103 are mounted in each post. The resistors are connected to the adjustable contacts. A wire 104 leads from the resistor 102 to a connection housing 105 and a wire leads from the housing to a meter 106. The meter may be read through an opening 107 in a base 108. Another wire leads from the meter back to the connection housing and is connected by a wire 109 to the resistor 103 mounted in the post 99.

This form of the device is used for testing the phasing of hot lines at section switches and the like. The entire device is made of insulating material and the operator can bring the adjustable contacts 100 and 101 into electrical connection with the wires or other electrical points to be checked. If any current is flowing through the wires, the meter 106 or indicator lamp, whichever is used, will indicate the fact and show the amount of current flowing. Each post is provided with a shoulder 110 and a petticoat insulator 111.

In the form of the device shown in Figure 4, a neon indicator lamp, or a filament indicator lamp may be used in place of the meter 106. Where the filament indicator lamp is used, it will shine dimly or brightly according to the voltage passing therethrough as described in the tester E hereinbefore. Where the meter 106 is used, it will indicate from 1000 to 5000 volts or from 1000 to 15,000 volts as the case may be. It is obvious that all of the devices could be used for increased voltages by adding more petticoat insulators, and generally enlarging the design.

The adjustable contacts 100 and 101 have collars 100a and 101a that limit the movement of the contacts toward each other so that the inner ends are prevented from contacting each other and forming a short circuit path.

The staff F has the same ground connection as in the other forms and like reference numerals have been applied which are similar to those used in the form illustrated in Figure 2. The meter 106 has a Lucite disc placed between it and the opening 107. Barriers 112 and 113 are placed in the staff F to prevent internal current creepage.

I claim:

1. A portable safety high voltage detector comprising a pair of hollow staffs made of insulating material and having electrical contact terminals at their upper ends, a resistor mounted in at least one of the staffs and being electrically connected to both terminals, electric current indicating means carried by one of the staffs and connected in series with the resistor and terminals so that a harmless low voltage current will flow through the electric current indicating means, a petticoat insulator mounted on the outer surface of each staff between the terminal and the opposite end of the staff for preventing the creeping of high voltage electric current beyond the insulator when the detector is used in wet weather, an electric barrier disc extending across the hollow portion of each staff and being placed below the resistor in the staff housing the resistor, a conductor ring disposed within each hollow staff and below the electric barrier, a "ground" collar placed on the outer surface of each staff at the same place thereon as the conductor ring and being electrically connected thereto, removable electrical current conducting means extending between the "ground" collars, and a "ground" connection leading from one of the collars for carrying away any high voltage currents that might creep along the inner or outer surfaces of the staffs, the staffs having hand grip portions disposed below the "ground" collars.

2. A portable safety high voltage detector comprising a pair of hollow staffs made of insulating material and having electrical contact terminals at their upper ends, a resistor mounted in at least one of the staffs and being electrically connected to both terminals, electric current indicating means carried by one of the staffs and connected in series with the resistor and terminals so that a harmless low voltage current will flow through the electric current indicating means, a petticoat insulator mounted on the outer surface of each staff between the terminal and the opposite end of the staff for preventing the creeping of high voltage electric current beyond the insulator when the detector is used in wet weather, an electric barrier disc extending across the hollow portion of each staff and being placed below the resistor in the staff housing the resistor, a conductor ring disposed within each hollow staff and below the electric barrier, a "ground" collar placed on the outer surface of each staff at the same place thereon as the conductor ring and being electrically connected thereto, removable electrical current conducting means extending between the "ground" collars, and a "ground" connection leading from one of the collars for carrying away any high voltage currents that might creep along the inner or outer surfaces of the staffs, the staffs having hand grip portions disposed below the "ground" collars, and insulating discs placed on opposite sides of each "ground" collar and extending outwardly a distance sufficient to prevent the operator's hands from contacting the collars.

ALBERT E. WEST.

REFERENCES CITED

The following references are of record in the file of this patent:

UNITED STATES PATENTS

| Number | Name | Date |
|---|---|---|
| 1,615,788 | Feldkamp | Jan. 25, 1927 |
| 1,644,422 | Doble | Oct. 4, 1927 |
| 1,684,768 | Iler | Sept. 18, 1928 |
| 1,723,861 | Isskiki | Aug. 6, 1929 |
| 1,831,372 | Spangler | Nov. 10, 1931 |

FOREIGN PATENTS

| Number | Country | Date |
|---|---|---|
| 8,291 | France | Feb. 20, 1908 |
| | (Addition to No. 369,128) | |
| 236,437 | Great Britain | July 9, 1925 |
| 456,520 | Germany | Feb. 24, 1928 |
| 476,228 | Great Britain | Dec. 3, 1937 |